United States Patent
Ningrat et al.

(10) Patent No.: US 9,817,530 B2
(45) Date of Patent: Nov. 14, 2017

(54) ELECTRONIC DEVICE WITH TOUCHSCREEN FOR REMOVING SAMPLE SUBSETS AND RELATED METHODS

(71) Applicant: STMICROELECTRONICS ASIA PACIFIC PTE LTD, Singapore (SG)

(72) Inventors: Kusuma Adi Ningrat, Seoul (KR); Lokesh Kumar Korapati, Singapore (SG); Jerry Kim, Kyounggi-do (KR)

(73) Assignee: STMICROELECTRONICS ASIA PACIFIC PTE. LTD., Singapore (SG)

( * ) Notice: Subject to any disclaimer, the term of this patent is extended or adjusted under 35 U.S.C. 154(b) by 273 days.

(21) Appl. No.: 14/840,556

(22) Filed: Aug. 31, 2015

(65) Prior Publication Data

US 2017/0060293 A1    Mar. 2, 2017

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ...................................................... G06F 3/041
USPC ........................................................ 345/174
See application file for complete search history.

(56) References Cited

U.S. PATENT DOCUMENTS

| | | | |
|---|---|---|---|
| 8,536,880 B2 | 9/2013 | Philipp | |
| 8,605,037 B2 | 12/2013 | Philipp et al. | |
| 8,830,180 B2 | 9/2014 | Yilmaz et al. | |
| 2010/0044122 A1 | 2/2010 | Sleeman et al. | |
| 2011/0254802 A1 | 10/2011 | Philipp | |
| 2012/0043976 A1* | 2/2012 | Bokma | H03K 17/955 324/679 |
| 2013/0141139 A1 | 6/2013 | Ballan et al. | |
| 2013/0257795 A1* | 10/2013 | Yilmaz | H03K 17/9622 345/174 |
| 2014/0071080 A1* | 3/2014 | Cok | G06F 3/044 345/174 |
| 2014/0375590 A1* | 12/2014 | Cok | G06F 3/044 345/174 |
| 2015/0042607 A1* | 2/2015 | Takanohashi | G06F 3/0416 345/174 |
| 2015/0070313 A1* | 3/2015 | Larsen | G01R 19/25 345/174 |

FOREIGN PATENT DOCUMENTS

CN      101672660 A      3/2010

* cited by examiner

*Primary Examiner* — Jason Olson
(74) *Attorney, Agent, or Firm* — Slater Matsil, LLP

(57) ABSTRACT

An electronic device may include a touchscreen having sensing capacitors, and readout circuitry. The readout circuitry may be configured to accumulate a sample set from each sensing capacitor, divide the sample set into sample subsets, remove a given sample subset when the given sample subset exceeds a threshold, and process remaining sample subsets for touch input.

22 Claims, 3 Drawing Sheets

ELECTRONIC DEVICE WITH TOUCHSCREEN FOR REMOVING SAMPLE SUBSETS AND RELATED METHODS

TECHNICAL FIELD

The present disclosure relates to the field of electronic devices, and, more particularly, to electronic devices with touch input and related methods.

BACKGROUND

Cellular communication systems continue to grow in popularity and have become an integral part of both personal and business communications. Cellular telephones allow users to place and receive phone calls most anywhere they travel. Moreover, as available cellular telephone technology has increased, so too has the functionality of cellular devices. For example, many cellular devices now incorporate Personal Digital Assistant (PDA) features such as calendars, address books, task lists, calculators, memo and writing programs, etc. These multi-function devices usually allow users to wirelessly send and receive electronic mail (email) messages and access the internet via a cellular network and/or a wireless local area network (WLAN), for example.

In the earliest cellular devices, the device included a numeric keyboard and small display for operation of the device. As cellular devices packaged more functionality therein, the typical numeric keypad gave way to the alpha-numeric keypad, thereby allowing a user to readily enter full linguistic text. Another consequence of the expansion of cellular device functionality is the desire to increase display size and resolution. A typical tradeoff during design of cellular devices is the exchange of space between the display and the keypad. This design tradeoff may be more problematic as users demand smaller and lighter devices that are easier and more convenient to carry.

An approach to this design tradeoff is to include a touchscreen input in the cellular device. In other words, this approach leans the aforementioned design tradeoff greatly in favor of the display by removing the keypad entirely as an input device, thereby providing the user with a larger display. Typically, an input to a touch screen is intended by the user when placing a finger or stylus on the screen causing the touch screen to generate a variety of signals to identify the location of the touch on the touch screen.

Typical user application scenarios may vary widely for cellular devices. They may be handheld or operated by placing on different surfaces that may or may not be conductive or well-grounded electrically. And such factors, like the effects of electrical grounding of the system, complicate the deciphering of the touch inputs. Also, external/unknown sources (e.g. during device charging or power up) of noise may make deciphering touch inputs problematic.

SUMMARY

Generally speaking, an electronic device may comprise a touchscreen comprising a plurality of sensing capacitors, and readout circuitry. The readout circuitry may be configured to accumulate a sample set from each sensing capacitor, divide the sample set into a plurality of sample subsets, remove a given sample subset when the given sample subset exceeds a threshold, and process remaining sample subsets for touch input. Advantageously, the readout circuitry may remove noisy sample subsets from being included in the touch input.

More specifically, the readout circuitry may be configured to determine the threshold based upon a sample value without touch input. The electronic device may also include a drive circuit configured to drive each sensing capacitor. The drive circuit may be configured to drive each sensing capacitor with a clock signal.

In some embodiments, the readout circuitry may comprise an amplifier coupled downstream of each sensing capacitor, a second capacitor coupled in parallel with the amplifier, an accumulator circuit coupled downstream from the amplifier, and an analog-to-digital converter (ADC) coupled downstream from the accumulator circuit. The accumulator circuit may be configured to have a gain value increased by a factor equal to a number of sample subsets in the sample set. The ADC may be configured to provide a digital output value for each sample subset.

Also, the electronic device may further comprise a processor coupled to the readout circuitry and configured to average values from the plurality of sample subsets. Each sample subset may have an equal number of samples.

Another aspect is directed to a touchscreen device. The touchscreen device may include a plurality of sensing capacitors, and readout circuitry. The readout circuitry may be configured to accumulate a sample set from each sensing capacitor, divide the sample set into a plurality of sample subsets, remove a given sample subset when the given sample subset exceeds a threshold, and process remaining sample subsets for touch input.

Yet another aspect is directed to a method of operating an electronic device comprising a touchscreen comprising a plurality of sensing capacitors, and readout circuitry. The method may include operating the readout circuitry to accumulate a sample set from each sensing capacitor, and operating the readout circuitry to divide the sample set into a plurality of sample subsets. The method may include operating the readout circuitry to remove a given sample subset when the given sample subset exceeds a threshold, and operating the readout circuitry to process remaining sample subsets for touch input.

DETAILED DESCRIPTION

Figure 1:
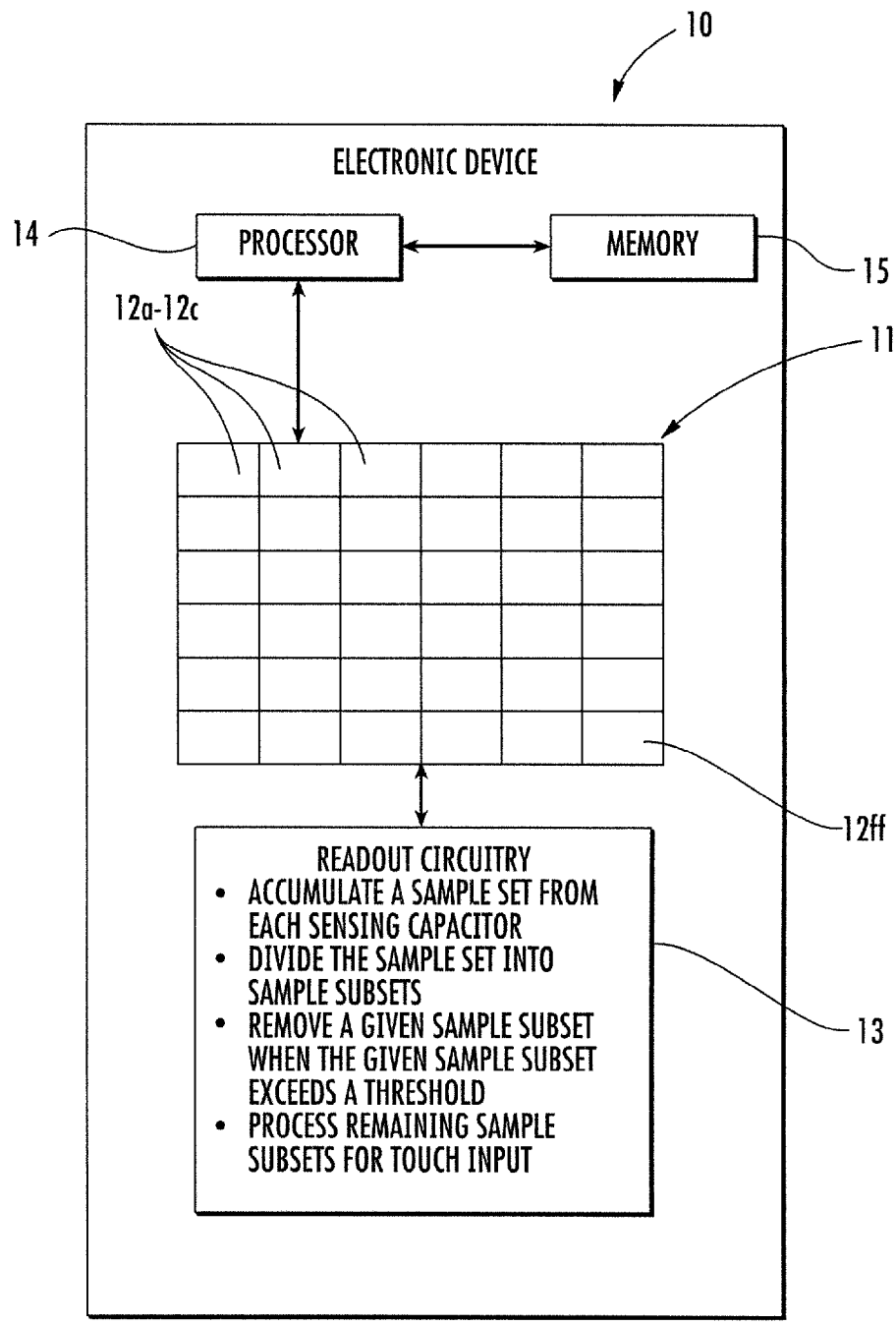
FIG. 1 is a schematic diagram of an electronic device, according to the present disclosure.
Figure 2:
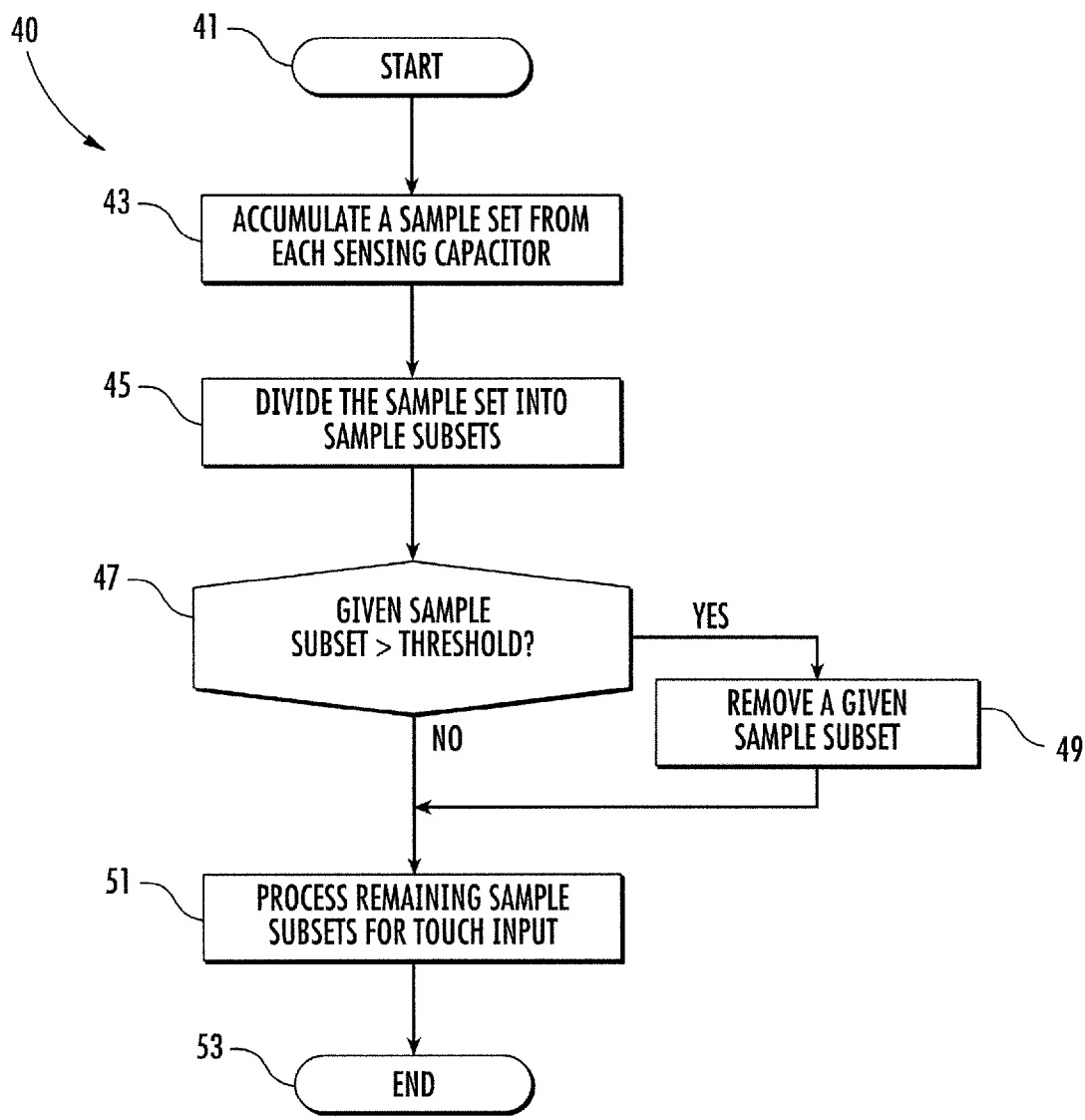
FIG. 2 is a flowchart of a method of operating the electronic device of FIG. 1.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Referring to FIGS. 1-4, an electronic device 10 according to the present disclosure is now described. Also, with reference to flowchart 40, which starts at Block 41, a method for operating the electronic device 10 is also described. The electronic device 10 illustratively includes a touchscreen 11 comprising a plurality of sensing capacitors 12a-12ff, readout circuitry 13 coupled to the touchscreen, a processor 14 coupled to the touchscreen, and a memory 15 coupled to the processor. The plurality of sensing capacitors 12a-12ff defines an array of touch sensitive pixels. Also, it should be appreciated that the touchscreen 11 may include a plurality of display pixels (not shown).

The processor 14, the memory 15, and the readout circuitry 13 may be carried by a single integrated circuit (IC) (i.e. on-chip or system-on-chip) or on separate IC dies. Also, a portion or all of the readout circuitry 13 may be embedded with each touch sensitive pixel.

Figure 3:
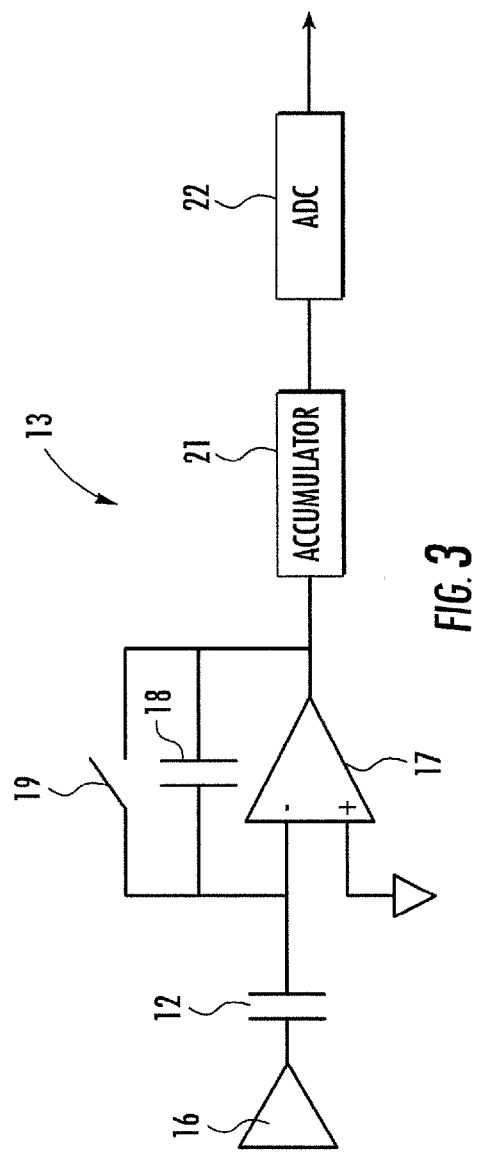
FIG. 3 is a circuit diagram of an example embodiment of the sensing capacitor and the readout circuitry from the electronic device of FIG. 1.
Figure 4:
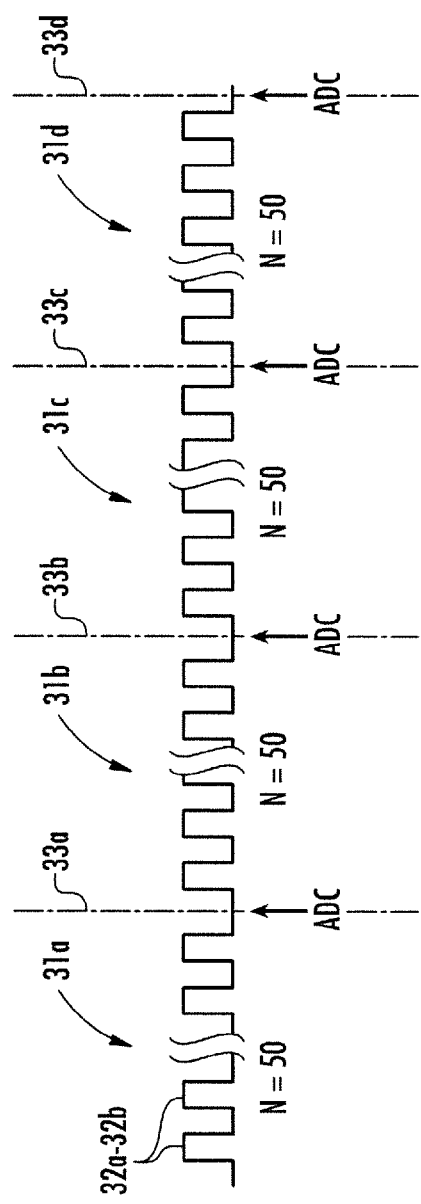
FIG. 4 is a schematic diagram of the sample set and sample subsets from the electronic device of FIG. 1.

As perhaps best seen in FIGS. 3 and 4, the electronic device 10 illustratively includes a drive circuit 16 configured to drive each sensing capacitor 12a-12ff. The drive circuit 16 may be configured to drive each sensing capacitor 12a-12ff with a clock signal. The drive circuit 16 may adjust the frequency and/or voltage of the clock signal depending on the application. The readout circuitry 13 is configured to accumulate a sample set 30 from each sensing capacitor 12a-12ff. In particular, the rising and/or falling edge transitions of the clock signal inject charge through each sensing capacitor 12a-12ff. Each of the rising and/or falling edge transitions represents a sample 32a-32b of touch input for each sensing capacitor 12a-12ff.

In particular, the electronic device 10 is configured to detect finger tip input capacitance at the plurality of sensing capacitors 12a-12ff. Typically, this sensing is done by acquiring a sample and then accumulating it in an analog circuit up to N samples. The accumulation may increase the sensitivity as well as acting as low pass filter. Due to this accumulation, the detection of the noise issue may not be easy as the data deviation caused by the noise is similar or lower than actual touch input. (See Tables 1-3).

Also, the readout circuitry 13 illustratively includes an amplifier 17 coupled downstream of each sensing capacitor 12a-12ff and having a first inverting input coupled to each sensing capacitor and a second non-inverting input coupled to a reference voltage (e.g. ground voltage). The readout circuitry 13 illustratively includes a second capacitor 18 coupled in parallel with the amplifier 17, and a reset switch 19 also coupled in parallel with the amplifier. The charge injected into each sensing capacitor 12a-12ff is captured by the second capacitor 18. The output of the amplifier 17 is proportional to the voltage of the clock signal and the voltage on each sensing capacitor 12a-12ff.

The readout circuitry 13 illustratively includes an accumulator circuit 21 coupled downstream from the amplifier 17, and an ADC 22 coupled downstream from the accumulator circuit. During acquisition of the touch input, the accumulator circuit 21 is configured to accumulate the voltage at an output of the amplifier 17 during a set of samples 32a-32b N (e.g. the illustrated 200). (Block 43). Each sample 32a-32b comprises a cycle of the clock signal from the drive circuit 16. Once the acquisition is complete, the amplifier 17 is reset via the reset switch 19 at points 33a-33d.

The readout circuitry 13 is configured to divide the sample set 30 into a plurality of sample subsets 31a-31d (e.g. the illustrated 4 sample subsets). (Block 45). The readout circuitry 13 is configured to remove a given sample subset 31a-31d when the given sample subset exceeds a threshold, and process remaining sample subsets for touch input. (Blocks 47, 49, 51, 53). Also, the processor 14 is configured to average values from the plurality of sample subsets 31a-31d. Each sample subset 31a-31d may have an equal number of samples 32a-32b.

The accumulator circuit 21 may be configured to have a gain value increased by a factor equal to a number of sample subsets 31a-31d in the sample set 30, thereby maintaining sensitivity within the sample subsets. The ADC 22 may be configured to provide a digital output value for each sample subset 31a-31d.

The readout circuitry 13 is configured to determine the threshold based upon a sample value without touch input. As shown in Table 1, with the number of samples 32a-32b equal to 200 (Acc), the accumulator circuit 21 produces a detectable output change between the touch and non-touch states of each sensing capacitor 12a-12ff.

TABLE 1

|  | Tx (V) | Cm (pF) | Cc (pF) | C2V output (V) | Acc | gain | Acc Output |
|---|---|---|---|---|---|---|---|
| No Touch | 12 | 0.5 | 100 | 0.06 | 200 | 0.1 | 1.2 |
| Touched | 12 | 0.4 | 100 | 0.048 | 200 | 0.1 | 0.96 |
|  |  |  |  |  |  | delta | 0.24 |

Table 2 demonstrates a typical approach, where the accumulator circuit produces a similar output change (i.e. more difficult to differentiate) between the non-touch state and the noisy state of each sensing capacitor.

TABLE 2

|  | Tx (V) | Cm (pF) | Cc (pF) | C2V output (V) | Acc | gain | Acc Output |
|---|---|---|---|---|---|---|---|
| No Noise | 12 | 0.5 | 100 | 0.06 | 200 | 0.1 | 1.2 |
| 1 noise Strike | 12 | 0.5 | 100 | 0.06 | 200 | 0.1 | 1.044 |
|  |  |  |  |  |  | delta | 0.156 |

In particular, in typical approaches, the processor or applicable host device would find it difficult to differentiate sample sets impacted by noise (e.g. electrical fast transient (EFT) noise, such as burst or pulse noise) from actual touch input. In other words, the processor, in typical approaches, may interpret noise as actual touch input.

Also, in typical approaches, the EFT noise may not be removed by frequency-hop or filter mitigation approaches. Because of this issue, the processor may not be able to accurately cancel out this noise.

To increase sensitivity, the electronic device 10 reduces the number of samples 32a-32b taken in by dividing the sample set 30 into the plurality of sample subsets 31a-31d. Each sample subset 31a-31d is converted by the ADC 22 to produce a respective digital output value, i.e. the readout circuitry 13 is reset at points 33a-33d. The processor 14 is configured to produce a final output comprising an average of the digital outputs for each of the plurality of sample subsets 31a-31d. Advantageously, if a sample subset 31a-31d is affected by noise, the electronic device 10 discards that sample subset, and the final output is the average of the remaining values from the other sample subsets. In the illustrated example sample set 30, each of the sample subsets 31a-31d is not affected by noise, and all are used in the final output.

Table 3 demonstrates that the accumulator circuit 21 produces a substantial output change (i.e. readily detectable) between the non-touch state sample subset 31a-31d and the noisy state sample subset of each sensing capacitor 12a-12ff. This permits the processor 14 to readily filter out the poor sample subsets 31a-31d.

TABLE 3

| | Tx (V) | Cm (pF) | Cc (pF) | C2V output (V) | Acc | gain | Acc Output |
|---|---|---|---|---|---|---|---|
| No Noise | 12 | 0.5 | 100 | 0.06 | 50 | 0.4 | 1.2 |
| 1 noise Strike | 12 | 0.5 | 100 | 0.06 | 50 | 0.4 delta | 0.576 0.624 |

In Tables 1-3, the operational characteristics are identical and comprise amplifier 17 power rail=0-3 V, VREF=1.5V; sensing capacitors 12a-12ff=0.5 pF; delta at sensing capacitors=0.1 pF; drive circuit 16=12 V; second capacitor 18=100 pF; and gain of accumulator circuit 21=0.4.

Another aspect is directed to a method of operating an electronic device 10 comprising a touchscreen 11 comprising a plurality of sensing capacitors 12a-12ff, and readout circuitry 13. The method may include operating the readout circuitry 13 to accumulate a sample set 30 from each sensing capacitor 12a-12ff, and operating the readout circuitry to divide the sample set into a plurality of sample subsets 31a-31d. The method may include operating the readout circuitry 13 to remove a given sample subset 31a-31d when the given sample subset exceeds a threshold, and operating the readout circuitry to process remaining sample subsets for touch input.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An electronic device comprising:
   a touchscreen comprising a plurality of sensing capacitors; and
   readout circuitry configured to
      accumulate a sample set from each sensing capacitor,
      divide the sample set into a plurality of sample subsets,
      remove a given sample subset when the given sample subset exceeds a threshold, and
      process remaining sample subsets for touch input.

2. The electronic device of claim 1 wherein said readout circuitry is configured to determine the threshold based upon a sample value without touch input.

3. The electronic device of claim 1 further comprising a drive circuit configured to drive each sensing capacitor.

4. The electronic device of claim 3 wherein said drive circuit is configured to drive each sensing capacitor with a clock signal.

5. The electronic device of claim 1 wherein said readout circuitry comprises:
   an amplifier coupled downstream of each sensing capacitor;
   a second capacitor coupled in parallel with said amplifier;
   an accumulator circuit coupled downstream from said amplifier; and
   an analog-to-digital converter (ADC) coupled downstream from said accumulator circuit.

6. The electronic device of claim 5 wherein said accumulator circuit is configured to have a gain value increased by a factor equal to a number of sample subsets in each sample set.

7. The electronic device of claim 5 wherein said ADC is configured to provide a digital output value for each sample subset.

8. The electronic device of claim 1 further comprising a processor coupled to said readout circuitry and configured to average values from the plurality of sample subsets.

9. The electronic device of claim 1 wherein each sample subset has an equal number of samples.

10. An electronic device comprising:
    a touchscreen comprising a plurality of sensing capacitors;
    readout circuitry configured to
       accumulate a sample set from each sensing capacitor,
       divide the sample set into a plurality of sample subsets,
       remove a given sample subset when the given sample subset exceeds a threshold, the threshold being based upon a sample value without touch input, and
       process remaining sample subsets for touch input; and
    a processor coupled to said readout circuitry and configured to average values from the plurality of sample subsets.

11. The electronic device of claim 10 further comprising a drive circuit configured to drive each sensing capacitor.

12. The electronic device of claim 11 wherein said drive circuit is configured to drive each sensing capacitor with a clock signal.

13. The electronic device of claim 10 wherein said readout circuitry comprises:
    an amplifier coupled downstream of each sensing capacitor;
    a second capacitor coupled in parallel with said amplifier;
    an accumulator circuit coupled downstream from said amplifier; and
    an analog-to-digital converter (ADC) coupled downstream from said accumulator circuit.

14. The electronic device of claim 13 wherein said accumulator circuit is configured to have a gain value increased by a factor equal to a number of sample subsets in said sample set.

15. A touchscreen device comprising:
    a plurality of sensing capacitors; and
    readout circuitry configured to
       accumulate a sample set from each sensing capacitor,
       divide the sample set into a plurality of sample subsets,
       remove a given sample subset when the given sample subset exceeds a threshold, and
       process remaining sample subsets for touch input.

16. The touchscreen device of claim 15 wherein said readout circuitry is configured to determine the threshold based upon a sample value without touch input.

17. The touchscreen device of claim 15 further comprising a drive circuit configured to drive each sensing capacitor.

18. The touchscreen device of claim 17 wherein said drive circuit is configured to drive each sensing capacitor with a clock signal.

19. A method of operating an electronic device comprising a touchscreen comprising a plurality of sensing capacitors, and readout circuitry, the method comprising:
    operating the readout circuitry to accumulate a sample set from each sensing capacitor;

operating the readout circuitry to divide the sample set into a plurality of sample subsets;

operating the readout circuitry to remove a given sample subset when the given sample subset exceeds a threshold; and operating the readout circuitry to process remaining sample subsets for touch input.

20. The method of claim 19 further comprising operating the readout circuitry to determine the threshold based upon a sample value without touch input.

21. The method of claim 19 further comprising operating a drive circuit to drive each sensing capacitor.

22. The method of claim 19 further comprising operating a processor to average values from the plurality of sample subsets.

* * * * *